FRED H. KANT
IRA B. GOLDMAN
CHARLES W. SKARSTROM    INVENTORS
CHESTER L. READ

United States Patent Office

3,237,379
Patented Mar. 1, 1966

3,237,379
ADSORPTION SYSTEMS IN HEATLESS
FRACTIONATION PROCESSES
Fred H. Kant, Cranford, N.J., Ira B. Goldman, Takoma Park, Md., and Charles W. Skarstrom, Montvale, and Chester L. Read, Westfield, N.J., assignors to Esso Research and Engineering Company, a corporation of Delaware
Filed Feb. 26, 1962, Ser. No. 175,710
4 Claims. (Cl. 55—58)

The present invention is concerned with an improved adsorption system in heatless fractionation processes wherein a multicomponent mixture in the vapor phase is separated into two streams having different physical properties. More specifically, the present invention is concerned with an improved adsorption system wherein a substantially pure component is obtained from a multicomponent mixture stream by heatless fractionation in the vapor phase using high pressure adsorption and low pressure desorption.

In its most specific aspect, the present invention is concerned with an improved adsorption system used in a heatless fractionation process wherein a substantially pure component is obtained from a multicomponent mixture by high pressure adsorption and low pressure desorption. The adsorbent which is used to separate key components from the multicomponent mixture to yield the desired substantially pure component, has very high capacity for the other components in the multicomponent mixture and therefore this adsorbent becomes saturated with these other more difficultly desorbable components and thus tends to lose adsorption capacity as the process continues.

In a specific embodiment of the present invention a dual adsorption system is used in the purification of hydrogen from a hydrogen-hydrocarbon mixture wherein the hydrocarbon mixture comprises hydrocarbon compounds having from 1 to 10 carbon atoms.

In the heatless fractionation process it is possible to obtain a high purity product with relatively high recoveries from the feed stream using the high pressure adsorption and low pressure desorption technique. However, when a stream having a broad range of compounds is being processed, the difficulty arises that the adsorbent often exhibits an extremely high capacity for some of the components in the feed stream.

In heatless fractionation there is a term used which defines the relative ease of separation of components which is called the relative velocity. Thus, with a given adsorption system processing a multicomponent stream the component or components which comprise the desired product pass through the adsorption zone at a relatively faster rate than the key component or components. Therefore, it is possible to discontinue the adsorption portion of the cycle before the key component or components break through the adsorbent bed into the primary effluent stream.

In this discussion the primary effluent stream is the unadsorbed portion of the feed stream which passes through the adsorption zone. The key component or components comprise that portion of the feed stream adsorbed in the adsorption zone.

It often arises that the more desirable component or components are present in the feed stream with key components having a broad range of physical properties. For instance, the separation of hydrogen from hydrocarbon compounds is made using activated characoal adsorbent which appears to adsorb hydrocarbon compounds on a molecular weight basis. Thus, the heavier hydrocarbon compounds are very difficult to desorb from the activated charcoal adsorbent and tend to accumulate thereon. This causes a decline in the capacity of the adsorbent for the lower molecular weight components.

It should be noted that when a broad range of components is being processed the adsorbent generally loses capacity even though the normal desorption technique is used, that is, depressuring the adsorption zone to the desorption pressure, and purging and repressuring the zone with a portion of the primary effluent. It may also be noted that purging the zone with a large volume of primary effluent tends to offset the capacity loss of the adsorbent to some extent. Also, a very low desorption pressure helps to reduce this capacity loss. However, both of these expedients have practical limitations. If the purge rate is increased to lower the rate of capacity decline a substantial loss in the recovery of the more desirable components results. This, of course, lowers the efficiency of the process.

With respect to the desorption pressure, there is a practical limitation as to how low a desorption pressure can be obtained. Furthermore, when a combustible gas is being processed a fire hazard arises since air tends to leak into the system.

Therefore, it is an object of the present invention to provide an adsorption system in a heatless fractionation process wherein there is substantially no adsorbent capacity decline even though a multicomponent stream comprising components with a broad range of physical properties is processed.

It is a further object of the present invention to provide a heatless fractionation process wherein extremely good recoveries of more desirable components present in the feed stream can be obtained with substantially no loss in adsorption capacity.

These objects of the present invention are achieved using multiple adsorbent stages. Adsorbents are selected which exhibit the proper affinity for a component or group of components. By having successive stages of adsorbents, each adsorbent removes a component or group of components from the feed stream as it passes through the adsorption zone until the final separation is made and the unadsorbeds components are taken off as primary effluent. The adsorbents are restored to initial capacity by desorbing the components in the steps of depressuring the adsorption zone to the desorption pressure, purging the zone with a portion of the primary effluent, and re-pressuring the zone with primary effluent.

In the present invention the adsorbents can be in separate fixed beds connected by a conduit or they can be in one zone thus being adjacent one to the other.

Other objects and advantages of the present invention will become apparent when viewed in light of the accompanying description and drawings.

Figure 1:
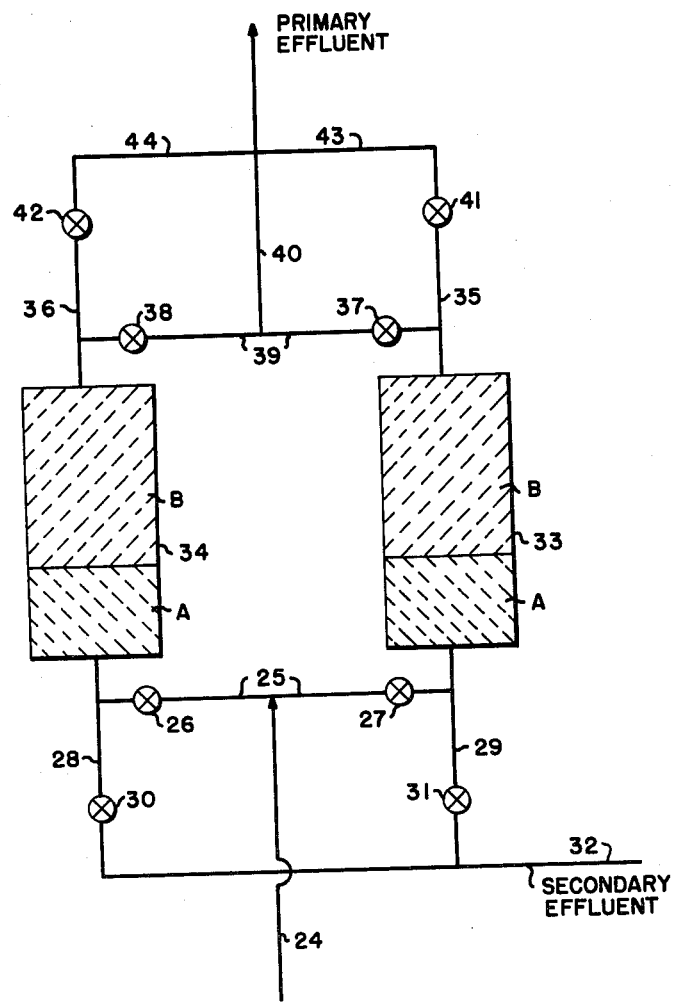
FIGURE 1 is a schematic representation of the heatless fractionation process employing the present invention.

Referring now to FIGURE 1 in more detail, numeral 24 designates the line in which the hydrogen-hydrocarbon mixture feed stream is introduced into the heatless fractionator. The feed stream in line 24 passes into header 25, through valve 27, into line 29 and into adsorption zone 33.

In this description adsorption zone 33 is on the adsorption portion of the cycle and adsorption zone 34 is on the desorption portion of the cycle. The two-zone system herein illustrated contemplates a continuous cyclic process wherein one zone is on the adsorption portion of the cycle and the other zone is on the desorption portion of the cycle. The feed stream, which contains hydrogen and hydrocarbon compounds, having from 1 to 10 carbon atoms, passes into adsorption zone 33. The lower portion of adsorption zone 33 is packed with adsorbent A while the upper portion of adsorption zone 33 is packed with adsorbent B. In this specific embodiment of the present invention adsorbent A is a wide pore silica gel adsorbent having an average pore diameter in the range of from 50 to 500 A. An average pore diameter in the range of from 100 to 200 A. is preferred. Adsorbent B is activated charcoal adsorbent. Thus, as the hydrogen-hydrocarbon mixture passes through adsorption zone 33 the $C_4+$ hydrocarbons are adsorbed on the wide pore silica gel. The $C_1$ to $C_3$ hydrocarbon compounds are adsorbed on the activated charcoal adsorbent. A substantially pure hydrogen stream (99.0+ mol percent) leaves adsorption zone 33 through line 35, valve 41 and into header 43 and is removed as primary effluent in line 40. Valve 37 remains closed during a portion of the adsorption period and is opened to allow purging of zone 33 and depressuring of that zone during the desorption portion of the cycle.

As previously mentioned, adsorption zone 34 is on the desorption portion of the cycle. Initially, zone 34 is at the adsorption pressure. Zone 34 is depressured by opening valve 30 so that the vapor in adsorption zone 34 passes through line 28, valve 30 and into header 32 where it is withdrawn as secondary effluent. Following the depressuring step, adsorption zone 34 is purged with a portion of the primary effluent in line 40.

The purge passes from line 40 through header 39, valve 38, line 36 and into adsorption zone 34. Both adsorbents in zone 34 are backwashed with purge. From adsorption zone 34 it passes through line 28, valve 30, header 32 and is withdrawn as secondary effluent. Following the purge step, adsorption zone 34 is repressured to the adsorption pressure with primary effluent.

The repressuring step is accomplished by closing valve 30. With valve 38 open the primary effluent passes from line 40 into header 39 through valve 38 into line 36 and into adsorption zone 34. When adsorption zone 34 has been repressured to substantially the adsorption pressure, valve 38 is closed and adsorption zone 34 is then ready to be put on the adsorption portion of the cycle. During the adsorption portion of the cycle the primary effluent from zone 34 is removed by means of line 36, valve 42, header 44, and is withdrawn as primary effluent through line 40.

Adsorption zone 33 is switched from the adsorption portion of the cycle to the desorption portion of the cycle by closing valves 27 and 41 and opening valve 31. Adsorption zone 34 is switched from the desorption portion of the cycle to the adsorption portion of the cycle by opening valves 26 and 42.

The adsorption temperature is generally the ambient temperature. However, it is within the scope of the present invention that this vapor phase separation occur either above or below that of the ambient. Since this is a heatless fractionation process, it is unnecessary to add heat to desorb the components on the adsorbent. This is accomplished by depressuring and then purging the adsorbent with primary effluent at low pressure. The adsorption pressure need not be limited except to the extent that the process of the present invention performs the separation in the vapor phase. Therefore, the combination of adsorption temperature and adsorption pressure should be such as will yield a vapor stream at the adsorption conditions.

The desorption pressure must necessarily be below the adsorption pressure. This may be either above or below atmospheric pressure. The desorption temperature is substantially the same as the temperature of adsorption.

As previously mentioned, prior art heatless fractionation techniques have encountered the difficulty that the adsorbent loses capacity when processing a feed stream having a wide range of different physical properties. However, in the process of the present invention no capacity loss is experienced since each adsorbent adsorbs only those components which can be readily desorbed.

In the specific embodiment of the present invention, the primary separation between hydrogen and methane takes place in the activated charcoal adsorbent portion of the adsorption zone. A secondary separation, however, takes place on the wide pore silica gel adsorbent. The $C_4+$ hydrocarbon compounds are removed from the feed stream on the wide pore silica gel adsorbent. The quantity of wire pore silica gel adsorbent must be such that during the adsorption portion of the cycle, which is in the range of from 1 to 30 minutes, the preferred range being from 3 to 10 minutes, substantially no $C_4+$ hydrocarbon compounds reach the activated charcoal adsorbent. The quantity of activated charcoal adsorbent in adsorption zone 33 and 34 must be such that during the adsorption portion of the cycle substantially no methane will break through into the substantially pure hydrogen stream which is taken off as primary effluent.

While this specific process has been described using the conventional depressuring, purging and repressuring techniques, other techniques known to those skilled in the art to improve the recovery of the more desirable components from the feed stream can be used. Some such methods are upflow depressuring pressure equalization between the two adsorption zones and upflow expansion of the gas trapped in the adsorption zone to backwash the zone.

As thus described the multiple adsorbent adsorption zone has been shown to be a single unit. However, it is within the scope of the present invention to provide the different adsorbents in substantially isolated compartments. As applied to the system specifically illustrated, the wide pore gel adsorbent is in a bed distinct from the activated charcoal adsorbent. Thus, in the desorption portion of the cycle, the wide pore silica gel adsorbent is depressured first. Then, after the wide pore silica gel adsorbent is depressured to the low desorption pressure, the activated charcoal adsorbent is depressured through it. Thus a purging effect is obtained as a result of the depressuring of the activated charcoal adsorbent through the wide pore silica gel adsorbent. This tends to increase the efficiency of operation of the wide pore silica gel adsorbent. Both adsorbents are purged with a portion of the primary effluent at the low desorption pressure.

The present invention is based primarily on selecting the proper adsorbents to perform the desired separation. In heatless fractionation processes taught by the prior art, any adsorbent showing selectivity for the key components in the feed stream would perform a satisfactory separation. It is true that a separation can be performed using conventional adsorbents. However, in order to obtain optimum recoveries of the more desirable components from the feed stream it is necessary to employ adsorbents which can perform the desired separation and still have the characteristic of being readily stripped of the adsorbed components. Therefore, an important concept of the present invention is that of the desorption mechanism.

Figure 2:
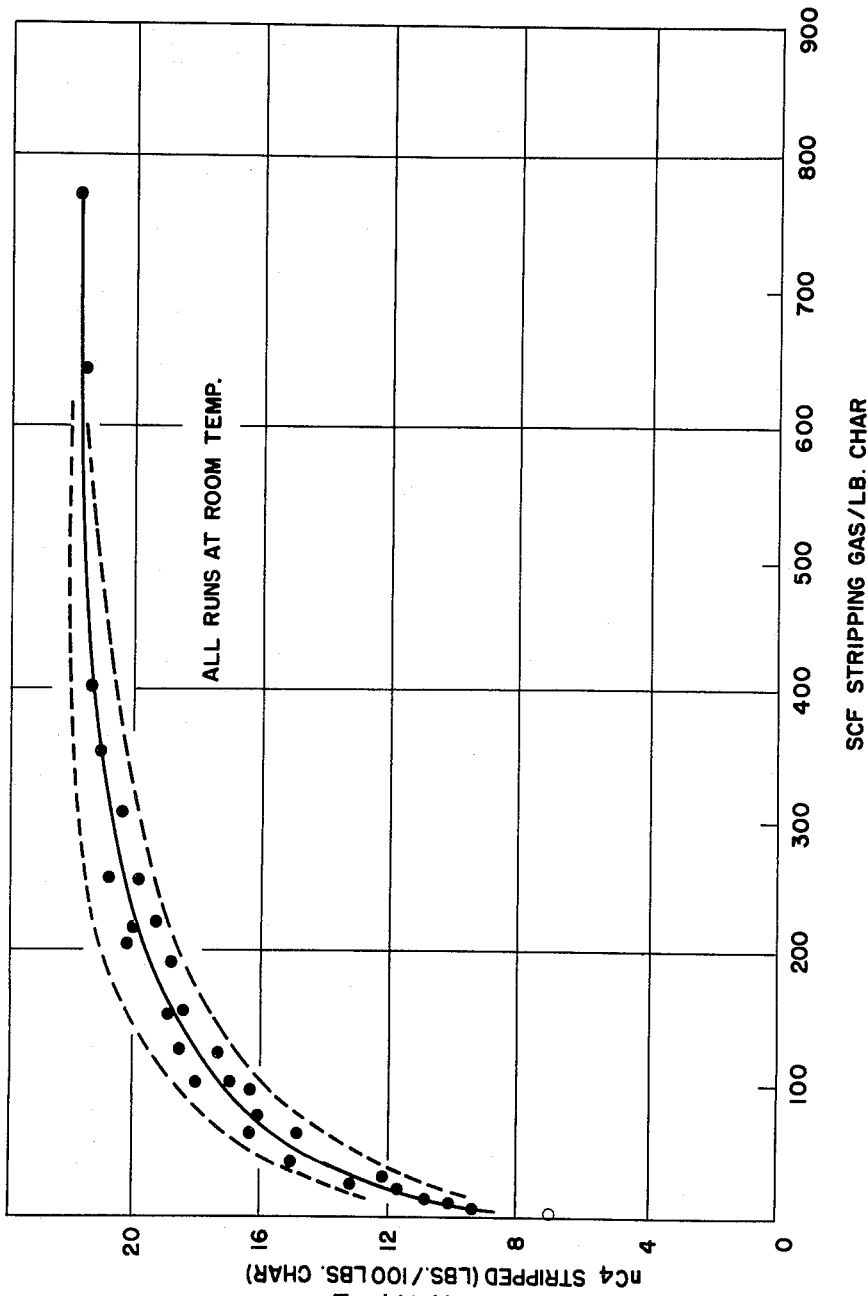
FIGURE 2 is a graphic illustration of the rate at which an adsorbed component is desorbed.

FIGURE 2 graphically illustrates the quantity of n-butane stripped from activated charcoal adsorbent as a function of the standard cubic feet of stripping gas per pound of activated charcoal adsorbent. These data were obtained with flow rates of either hydrogen or nitrogen stripping gas varying from 1–15 s.c.f./hr. They were also obtained with varying adsorbent particle sizes in the range of 10–100 mesh. Furthermore, the stripping data also cover experiments with varying bed diameters from 8 mm. to 35 mm. The fact that the stripping data all correlate with the amount of stripping gas passed over the system, and not the rate at which this gas is introduced, means that the mechanism controlling the desorption is the equilibrium between adsorbate and adsorbent.

It may therefore be visualized that the desorption occurs in the following manner. When a stripping gas, such as nitrogen or hydrogen, is passed through an adsorbent bed saturated with n-butane, an immediate equilibrium is set up between the gas and the adsorbent such that the partial pressure of n-butane in the gas phase is that dictated by equilibrium based on the amount adsorbed. In order to establish this equilibrium, some n-butane is removed from the adsorbent. As a result, a new concentration of adsorbed material on the adsorbent is reached. This new concentration corresponds to a new partial pressure in the gas phase at equilibrium, which will be lower than the partial pressure at the start of the desorption period. This process of desorption continues always following the equilibrium relation between adsorbed material and partial pressure in the vapor phase. Since the partial pressure is always governed by the amount adsorbed, and since the partial pressure determines the concentration of the adsorbed material in the vapor phase, the total amount stripped from the adsorbent is simply determined by the total quantity of gas available during the desorption step. This then explains why the desorption rate is simply a function of the amount of stripping gas passed through the system.

Figure 3:
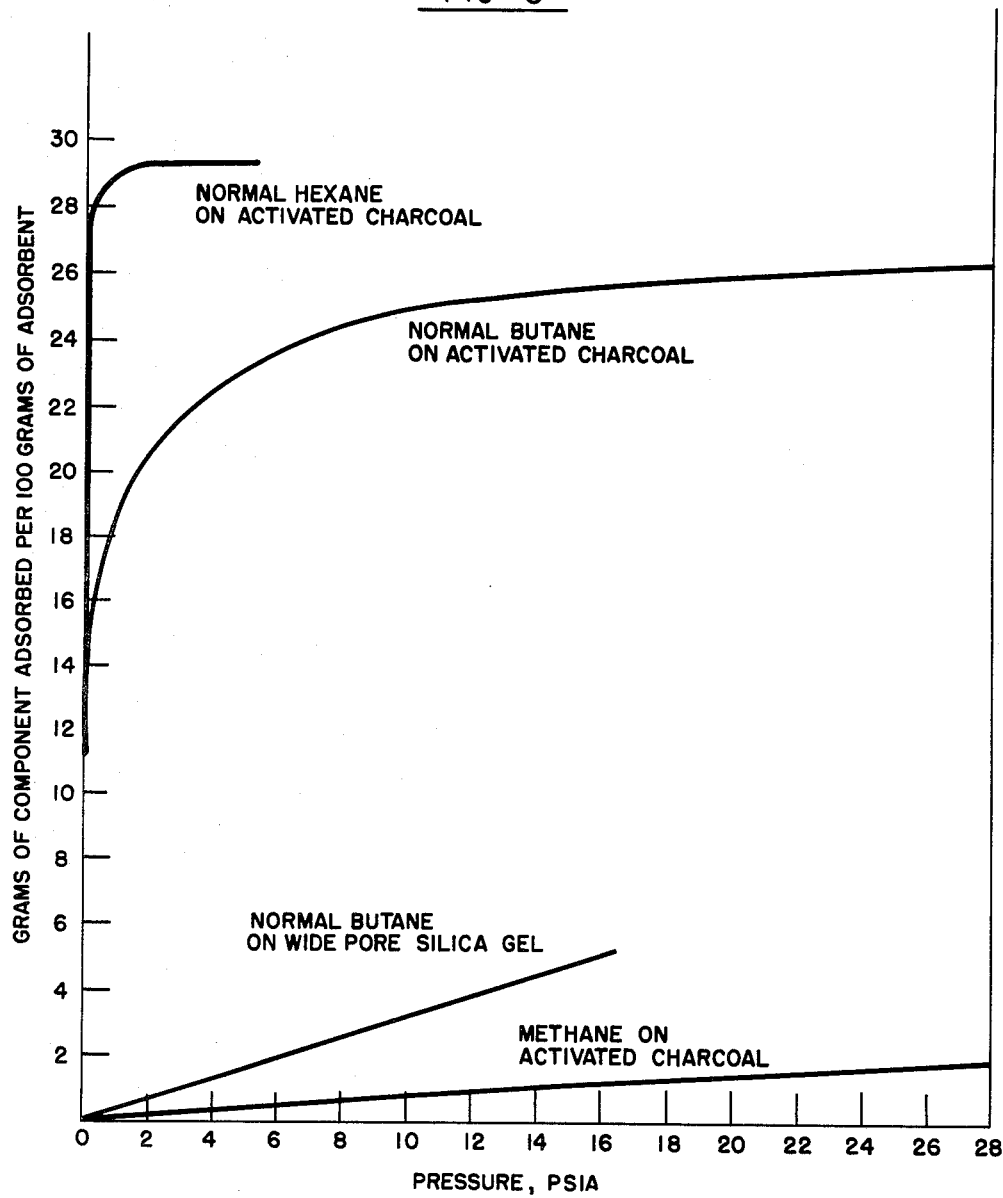
FIGURE 3 is a graphic illustration of the adsorption isotherm of n-hexane, n-butane and methane on activated charcoal adsorbent.

FIGURE 3 graphically illustrates the adsorption isotherms of n-hexane, n-butane and methane on activated charcoal adsorbent. Also, the adsorption isotherm of n-butane on wide pore silica gel is shown for comparison. In this figure the quantity of component adsorbed in grams per 100 grams of adsorbent is plotted as a function of the partial pressure of the component in the vapor phase over the adsorbent. These adsorption isotherms are obtained by passing the component through the adsorbent bed until adsorption equilibrium is obtained at the given pressure level. The weight increase of the adsorbent is then measured to determine the quantity of component adsorbed. The isotherms for n-hexane, n-butane and methane on activated charcoal were obtained at a temperature of 77° F. The isotherm for n-butane on wide pore silica gel was obtained at a temperature of 100° F.

Looking first at the adsorption isotherms for three compounds on activated charcoal adsorbent, it will be noted that the methane isotherm is the only one which is substantially linear. Furthermore, it will be noted from the prior art that methane does not contribute to the capacity loss of activated charcoal adsorbent. That is, methane is not so difficult to desorb from the activated charcoal adsorbent that it tends to accumulate thereon.

On the other hand, the adsorption isotherm for both n-hexane and n-butane on activated charcoal adsorbents are nonlinear, with the n-hexane much more curved than the n-butane. These components both contribute to the capacity losses in the activated charcoal adsorbent in the heatless fractionation process in that they are very difficult to desorb from the adsorbent. Particularly, the n-hexane is more difficult to desorb than the n-butane, which correlates with the degree of nonlinearity of the adsorption isotherm.

It may also be seen that the adsorption isotherm of n-butane on wide pore silica gel is substantially linear. As will be pointed out in more detail later, the n-butane as well as higher molecular weight hydrocarbon compounds are readily desorbed from the wide pore silica gel adsorbent at purge to feed ratios of 1.0.

In this description the purge to feed ratio is taken as the ratio of the volume of purge at the low desorption pressure to the volume of feed at the high adsorption pressure.

Thus, it has been found that the adsorbents used in the heatless fractionation process are selected on the basis of the adsorption isotherm of the components in the feed stream being processed. The mere fact that an adsorbent exhibits an affinity for the components to be adsorbed is not a satisfactory nor sufficient criterion. In order to obtain the maximum recovery of the desired components from the feed stream without incurring the decline in adsorbent capacity with time, the relationship between the adsorbent selected and the component to be adsorbed should be such that all of the adsorbed material will exhibit approximately a linear adsorption isotherm on the adsorbent in the range of partial pressures that these components exhibit in the feed stream.

In the present invention then, adsorbents are selective for the components in the feed stream sought to be adsorbed, and the equilibrium capacity of the adsorbent is substantially linear with the pressure of the adsorbed component at a constant temperature.

*Table I*

| Adsorbent | Avg. Pore Dia., A. | Equil. nC₇ Cap., Gm./100 Gms. | Time to Strip Given Percent of nC₇, Hrs. | | | |
|---|---|---|---|---|---|---|
| | | | 25 | 50 | 75 | 100 |
| HCC Charcoal | 20 | 28 | 5 | >25 | | |
| CAL Decol. Char. | 40 | 31 | 1 | 25 | >25 | |
| Silica Gel | 60 | 18 | 0.75 | 2 | 5 | ca. 20 |
| Wide Pore Silica Gel | 140 | 3.5 | 0.035 | 0.067 | 0.1 | 0.15 |
| Eta Alumina | 65 | 5 | | 0.5 | | 1.5 |

N₂ flow rates: 6–10 s.c.f./hr.
Adsorption at 100° F., using 40 mm. Hg NC₇ in N₂ at 14.7 p.s.i.a. total pressure.
Stripping at 100° F., with 14.7 p.s.i.a. N₂.
Adsorbent particle sizes from 12 to 28 mesh particles.

The data in Table I illustrate the desirability of using wide pore silica gel to adsorb hydrocarbon compounds having from 4 to 10 carbon atoms. These data were obtained by adsorbing n-heptane on the adsorbents indicated in the first column. The equilibrium capacity of the adsorbents at a partial pressure of n-heptane of 40 mm. mercury and a temperature of 100° F. is shown in the third column. The time required to strip the n-heptane from the adsorbent using N₂ at a rate of 6 to 10 s.c.f./hr. and a temperature of 100° F. is also shown. All of the adsorbents listed exhibit an affinity for n-heptane. However, wide pore silica gel, with an average pore diameter of about 140 A., exhibits the desorption characteristics which recommend it for use in a heatless fractionation process for the adsorption of hydrocarbon compounds having from 4 to 10 carbon atoms. It may be seen that the wide pore silica gel required the smallest amount of purge to completely desorb n-heptane, of the adsorbents shown.

Figure 4:
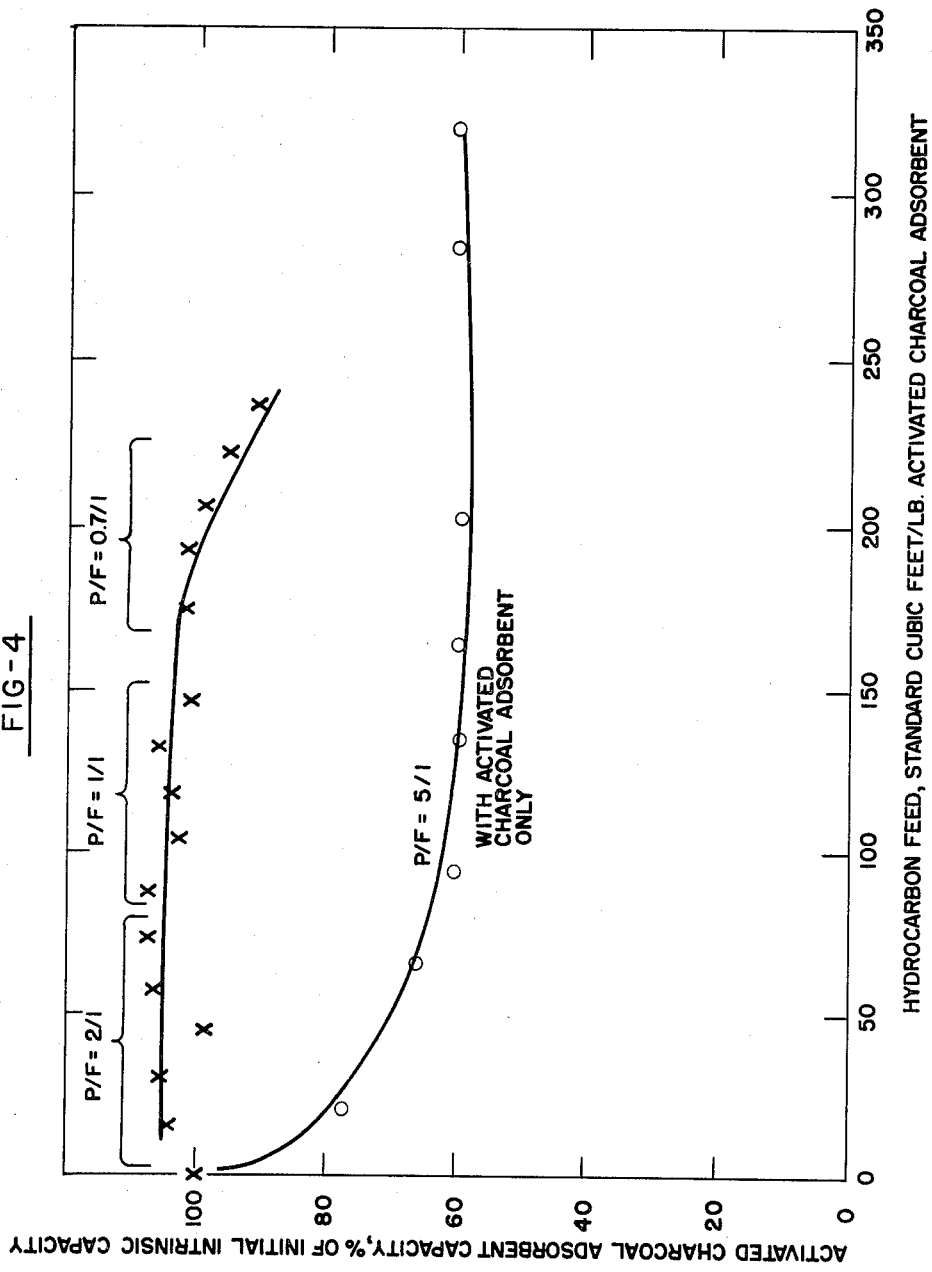
FIGURE 4 is a graphic illustration showing the effectiveness of a dual adsorption system of the present invention.

FIGURE 4 is a graphic illustration of the effectiveness of a dual adsorbent comprising 30 wt. percent wide pore silica gel followed by 70 vol. percent of HCC activated charcoal, used in a simulated heatless fractionation cycle to separate hydrogen from hydrocarbon compounds. In FIGURE 4 the methane capacity of the activated charcoal adsorbent in the adsorption zone is plotted as a function of the standard cubic feet of hydrocarbon feed passed through the zone per pound of activated charcoal in the zone.

The feed composition is 99 vol. percent H₂ and 1% C₄/C₈ hydrocarbons. The feed was obtained by saturating hydrogen with C₄+ catalytic reformate at a temperature of 32° F. and 100 p.s.i.g.

The adsorption and desorption conditions were a pressure of 50 p.s.i.g. and a temperature of 100° F. The adsorption and desorption portions of the cycle were 6 minutes each. The feed flow rate was about 1.0 s.c.f./hr. and the hydrogen purge flow rate was varied from 2 s.c.f./hr. to 0.7 s.c.f./hr. In this manner, various purgeto-feed ratios could be achieved, varying from 2/1 to 0.7/1. The methane capacity of the adsorbent was checked periodically by measuring the time to methane breakthrough for a 50/50 $H_2$/methane mixture at 50 p.s.i.g.

The results from the experiments with the dual adsorbent system were compared to those using only HCC activated charcoal as the adsorbent under similar process conditions.

It may be seen that with a purge rate of about 5 s.c.f./hr. the methane capacity of the adsorption zone packed only with activated charcoal quickly dropped to 60% of its initial capacity at which point it stabilized. This is due to the accumulation of the $C_4+$ hydrocarbon compounds in the feed on the activated charcoal adsorbent. On the other hand, even with a purge rate of about 1.0 s.c.f./hr., the adsorption zone packed with 30% wide pore silica gel and 70% activated charcoal, showed no methane capacity loss.

However, upon reducing the purge rate to 0.7 s.c.f./hr., a capacity decline is indicated. This is due to the fact that the concentration gradient of the components adsorbed on the wide pore silica gel was not swept back as far during the desorption portion of the cycle as it was swept forward during the adsorption portion of the cycle. The net result of this was to allow the heavy hydrocarbon compounds to break through into the activated charcoal portion of the adsorption zone and bring about an adsorbent capacity loss.

Figure 5:
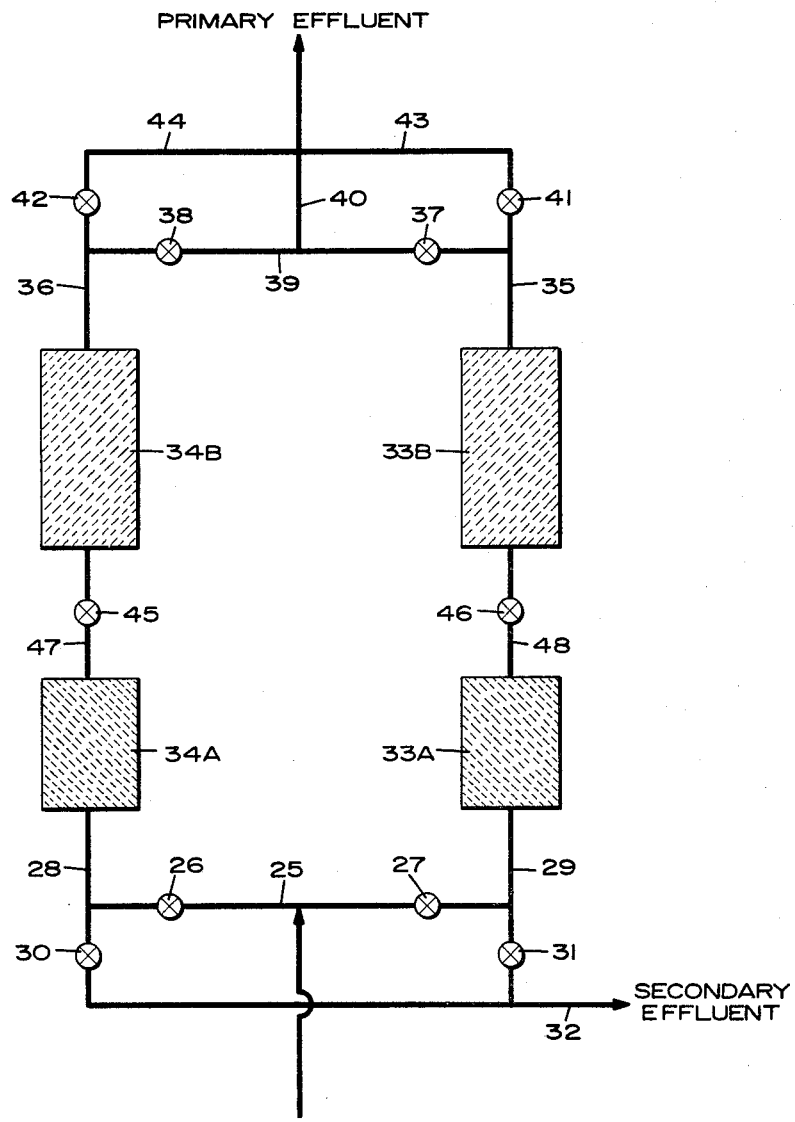
FIGURE 5 is a schematic representation of the heatless fractionation process wherein the embodiment employing physically separated adsorbent zones in each bed is shown.

FIGURE 5 is a schematic description of the specific embodiment of the present invention wherein the adsorbent zones in each of the beds are physically separated. The numbering used in FIGURE 5 is identical to that of FIGURE 1 except for the added elements indicated below. Zone A and zone B of bed 34 (indicated as 34A and 34B respectively) are separated and line 47 and valve 45 are interjected between them. During depressuring, valve 30 is opened while valve 45 is closed thereby allowing zone A to be depressured independently of zone B. Subsequently, valve 45 is opened and zone B is depressured through zone A.

Line 48 and valve 46 perform the respective same functions for zones A and B of bed 33 (indicated as 33A and 33B respectively).

Thus, in the multiple adsorbent system of the present invention, the quantity of each adsorbent must be such that the concentration gradient of the adsorbed components stays within the physical bounds of each adsorbent type. Furthermore, at steady state, the concentration gradient of the adsorbed components on each adsorbent is swept backward during the desorption portion of the cycle as far as it is swept forward during the adsorption portion of the cycle. Thus, there is an oscillating concentration gradient of the adsorbed components on each adsorbent.

The adsorbents are staged in series so that each adsorbs only those components in the feed stream which exhibit a substantially linear adsorption isotherm.

While the present invention has been described with particularity toward the separation of hydrogen from a mixture of hydrocarbon compounds having from 1 to 10 carbon atoms, it will become apparent to one skilled in the art that the process of the present invention is applicable to any situation wherein a stream of several components having a wide range of physical properties is fractionated in the vapor phase. Unless otherwise indicated, the previously described experimental illustrations of the practice of the present invention were conducted in a system wherein each adsorption vessel was one inch in diameter by five feet in length.

Having described this invention, what is sought to be protected by Letters Patent is set out in the following claims.

What is claimed is:

1. Process for the heatless fractionation separation of hydrogen from a gaseous feed stream comprising hydrogen and hydrocarbon compounds which contain about 1 to 10 carbon atoms, said process utilizing two adsorption zones to which no heat is added or removed during the process, said two adsorption zones being characterized by having a one end and another end, said process comprising the steps of flowing said feed stream from one end to the other end through a first zone of adsorbents, consisting of a first bed of silica gel adsorbent having an average pore diameter in the range from about 100 to 200 Angstrom units and a second bed of activated charcoal adsorbent initially relatively free of said hydrocarbon compounds, at a preselected, initial relatively high pressure in an initial cycle, said beds being arranged in the adsorption zone in such manner that the silica gel adsorbent is adjacent said one end and said activated carbon adsorbent is adjacent said other end, said adsorbents being preferentially selective for said hydrocarbon compounds, discharging a hydrogen-enriched stream from said first zone as a primary effluent, segregating a portion of said primary effluent as a product stream and withdrawing the same, passing the remainder of said primary effluent from the other end to the one end through a second zone of adsorbents at a relatively low pressure, said second zone of adsorbents consisting of a first bed of silica gel adsorbent having an average pore diameter in the range from about 100 to 200 Angstrom units and a second bed of activated charcoal adsorbent, the adsorbents being arranged in said second zone in such manner that said silica gel adsorbent is adjacent said one end and said activated carbon adsorbent is adjacent said other end, said adsorbents in said second zone being relatively saturated with said hydrocarbon compounds as compared with said first zone at the start of said initial cycle, whereby as said initial cycle continues, said first zone becomes relatively saturated with said hydrocarbon compounds progressively from said one end toward said other end, and whereby said second zone becomes relatively free of said hydrocarbon compounds from said other end toward said one end, continuing said initial cycle for a time period less than that required to secure saturation of said first zone at said other end with said hydrocarbon compounds and that required to secure freedom from said hydrocarbon compounds of said second zone at said one end, thereafter introducing said feed stream into said one end of said second zone at said initial relatively high pressure, discharging said gaseous mixture stream from said other end of said second zone as a hydrogen-enriched, primary effluent, segregating a portion of said last-named primary effluent as a product stream and withdrawing the same, passing the remainder of said last-named primary effluent from said other end to said one end through said first zone at relatively low pressure, said relatively low pressures in the respective zones being attained by reducing the pressure initially at said one end whereby said silica gel adsorbent is depressurized first and said activated carbon adsorbent is depressurized secondly, thereafter cyclically continuing the operation, and wherein the silica gel adsorbent is present in each said zone in sufficient quantity so as to prevent the breakthrough of $C_4+$ hydrocarbons into the activated carbon adsorbents.

2. The process of claim 1 in which the silica gel adsorbent and the activated charcoal adsorbent in each of the first and second adsorption zones are in juxtaposition in a single casing.

3. The process of claim 1 in which the silica gel adsorbent and the activated charcoal adsorbent in each of the first and second adsorption zones are in separate casings.

4. The process of claim 3 in which the pressure of the adsorbents in the separate casings are independently controlled.

(References on following page)

References Cited by the Examiner

UNITED STATES PATENTS

| | | | |
|---|---|---|---|
| 1,798,733 | 3/1931 | Hasche | 55—58 |
| 2,632,726 | 3/1953 | Ringham et al. | 55—62 |
| 2,698,305 | 12/1954 | Plank et al. | 252—449 |
| 2,782,869 | 2/1957 | Gray | 55—74 |
| 2,818,137 | 12/1957 | Richmond et al. | 55—75 |
| 2,944,627 | 7/1960 | Skarstrom | 55—62 |
| 2,992,703 | 7/1961 | Vasan et al. | 55—62 |
| 3,024,868 | 3/1962 | Milton | 55—75 |
| 3,061,992 | 11/1962 | Russell | 55—31 |
| 3,069,830 | 12/1962 | Skarstrom et al. | 55—179 |
| 3,094,569 | 6/1963 | Thomas | 55—75 |
| 3,109,722 | 11/1963 | Dow | 55—62 X |
| 3,111,387 | 11/1963 | Avery et al. | 55—75 X |
| 3,141,748 | 7/1964 | Hoke et al. | 55—58 |
| 3,142,547 | 7/1964 | Marsh et al. | 55—58 X |
| 3,150,942 | 9/1964 | Vasan | 55—62 X |

FOREIGN PATENTS 850,608   10/1960   Great Britain.

REUBEN FRIEDMAN, *Primary Examiner.*